(12) United States Patent
Tanaka

(10) Patent No.: US 7,589,733 B2
(45) Date of Patent: Sep. 15, 2009

(54) LAYOUT ELEMENT ARRANGING DEVICE, LAYOUT ELEMENT ARRANGING METHOD, LAYOUT ELEMENT ARRANGING PROGRAM, COMPUTER READABLE RECORDING MEDIUM, AND ELECTRONIC APPARATUS

(75) Inventor: Toshio Tanaka, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 711 days.

(21) Appl. No.: 11/064,029

(22) Filed: Feb. 23, 2005

(65) Prior Publication Data
US 2005/0195659 A1    Sep. 8, 2005

(30) Foreign Application Priority Data
Feb. 23, 2004 (JP) ............... 2004-046313
Nov. 22, 2004 (JP) ............... 2004-336983

(51) Int. Cl.
*G06T 13/00* (2006.01)
*G06T 11/20* (2006.01)

(52) U.S. Cl. ............... 345/474; 345/636; 345/440

(58) Field of Classification Search .......... 345/474, 345/636, 440, 473
See application file for complete search history.

(56) References Cited

U.S. PATENT DOCUMENTS

| | | | | |
|---|---|---|---|---|
| 5,610,842 A * | 3/1997 | Seki et al. | ............... | 345/473 |
| 5,831,632 A * | 11/1998 | Schuster et al. | ............... | 345/441 |
| 5,870,564 A * | 2/1999 | Jensen et al. | ............... | 709/241 |
| 6,091,427 A * | 7/2000 | Boezeman et al. | ............... | 345/474 |
| 6,108,100 A * | 8/2000 | McVey et al. | ............... | 358/1.16 |
| 6,111,590 A * | 8/2000 | Boezeman et al. | ............... | 345/474 |
| 6,310,622 B1 | 10/2001 | Asente | | |
| 6,522,328 B1 | 2/2003 | Asente | | |
| 6,784,886 B1 * | 8/2004 | Cailloux | ............... | 345/440 |
| 6,803,913 B1 * | 10/2004 | Fushiki et al. | ............... | 345/467 |
| 7,028,260 B1 * | 4/2006 | Morsello | ............... | 715/210 |
| 7,082,260 B2 * | 7/2006 | Longobardo et al. | ............... | 392/408 |
| 7,256,799 B2 | 8/2007 | Hatanaka et al. | | |
| 7,274,367 B2 * | 9/2007 | Haratsch et al. | ............... | 345/473 |
| 2002/0113794 A1 * | 8/2002 | Wu | ............... | 345/474 |

FOREIGN PATENT DOCUMENTS

JP   A-2003-87549   3/2003

OTHER PUBLICATIONS

Kuffner, Motion Planning for Digital Humans, Jul. 2003, IEEE International Symposium on Computational Intelligence in Robotics and Automation, Jul. 2003, pp. 912-917.*

* cited by examiner

*Primary Examiner*—M Good Johnson
(74) *Attorney, Agent, or Firm*—Oliff & Berridge, PLC

(57) ABSTRACT

Aspects of the invention can provide natural eye flow chasing images arranged on a path and fully give the feeling of being, liveliness and truthfulness, by matching a direction of the image and a direction of the arrangement point or an acquisition time of the image and a relative position thereof on the path. The layout element arranging device according to the invention can include a first selection unit for selecting one path from L paths respectively having M arrangement points, and a second selection unit for selecting one layout element to arrange the one layout element among N layout elements to one arrangement point among the M arrangement points of the selected one path.

22 Claims, 17 Drawing Sheets

| PATH | | ARRANGEMENT POINT | | | |
|---|---|---|---|---|---|
| PATH NUMBER | PATH-SHAPE | ARRANGEMENT POINT NUMBER | COORDINATE | TIME INFORMATION | SPECIFIED TIME INFORMATION |
| P1 | H1 H2<br>H4 H3 | H1 | ( 50, 30) | 0 | INDEFINITE |
| | | H2 | (180, 60) | 0.3 | APRIL |
| | | H3 | (150,180) | 0.7 | APRIL |
| | | H4 | ( 30,190) | 1 | JANUARY |

FIG. 5
| PATH | | ARRANGEMENT POINT | | |
|---|---|---|---|---|
| PATH NUMBER | PATH SHAPE | ARRANGEMENT POINT NUMBER | COORDINATE | TIME INFORMATION |
| P1 | 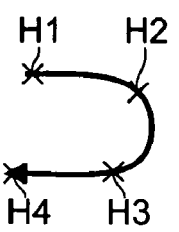 | H1 | ( 50, 30) | 0 |
| | | H2 | (180, 60) | 0.4 |
| | | H3 | (150,180) | 0.7 |
| | | H4 | ( 30,190) | 1 |
| P2 | 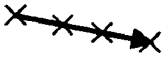 | | | |
| P3 |  | | | |
| P4 | 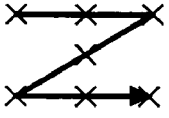 | | | |
| P5 |  | | | |
| P6 |  | | | |

FIG. 6
| IMAGE NUMBER | IMAGE CONTENT | ACQUISITION TIME | TIME INFORMATION |
|---|---|---|---|
| G 1 |  START | 2003/09/15 09:09:23 | 0 |
| G 2 |  LATE START | 2003/09/15 09:09:25 | 0.05 |
| G 3 | 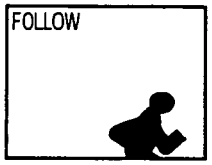 FOLLOW | 2003/09/15 09:09:30 | 0.18 |
| G 4 |  MIDDLE PHASE 1 | 2003/09/15 09:09:33 | 0.25 |
| G 5 |  MIDDLE PHASE 2 | 2003/09/15 09:09:36 | 0.33 |
| G 6 | 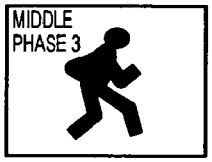 MIDDLE PHASE 3 | 2003/09/15 09:09:38 | 0.45 |
| G 7 |  RECOVER | 2003/09/15 09:09:50 | 0.72 |
| G 8 |  RUN ALONE | 2003/09/15 09:09:59 | 0.9 |
| G 9 |  GOAL | 2003/09/15 09:10:03 | 1 |

FIG. 12
| PATH | | ARRANGEMENT POINT | | |
|---|---|---|---|---|
| PATH NUMBER | PATH SHAPE | ARRANGEMENT POINT NUMBER | COORDINATE | DIRECTIONAL INFORMATION |
| P1 | 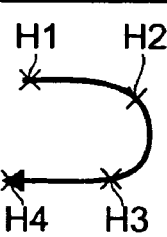 | H1 | ( 50, 30) | 0 |
| | | H2 | (180, 60) | 315 |
| | | H3 | (150,180) | 195 |
| | | H4 | ( 30,190) | 180 |
| P2 |  | | | |
| P3 | 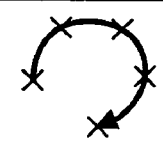 | | | |
| P4 |  | | | |
| P5 | 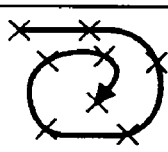 | | | |
| P6 | 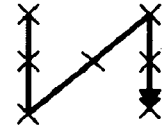 | | | |

FIG. 13
| IMAGE NUMBER | IMAGE CONTENT | ACQUISITION TIME | DIRECTIONAL INFORMATION |
|---|---|---|---|
| G 1 |  START | 2003/09/15 09:09:23 | 0 |
| G 2 |  LATE START | 2003/09/15 09:09:25 | 350 |
| G 3 | 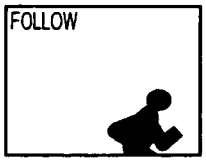 FOLLOW | 2003/09/15 09:09:30 | 355 |
| G 4 |  MIDDLE PHASE 1 | 2003/09/15 09:09:33 | 5 |
| G 5 |  MIDDLE PHASE 2 | 2003/09/15 09:09:36 | INDEFINITE |
| G 6 |  MIDDLE PHASE 3 | 2003/09/15 09:09:38 | 0 |
| G 7 | 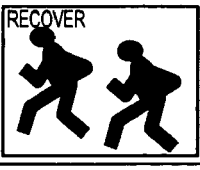 RECOVER | 2003/09/15 09:09:50 | 180 |
| G 8 |  RUN ALONE | 2003/09/15 09:09:59 | 190 |
| G 9 |  GOAL | 2003/09/15 09:10:03 | 185 |

| PATH | | ARRANGEMENT POINT | | |
|---|---|---|---|---|
| PATH NUMBER | PATH SHAPE | ARRANGEMENT POINT NUMBER | COORDINATE | SPECIFIED TIME INFORMATION |
| P1 | H1 H2<br>H4 H3 | H1 | ( 50, 30) | MAY |
| | | H2 | (180, 60) | AUGUST |
| | | H3 | (150,180) | OCTOBER |
| | | H4 | ( 30,190) | DECEMBER |

FIG. 17

| IMAGE NUMBER | IMAGE CONTENT | ACQUISITION TIME | SPECIFIED TIME INFORMATION |
|---|---|---|---|
| G20 | ENTRANCE CEREMONY | 2003/04/19 09:40:27 | APRIL |
| G21 | GOLDEN WEEK | 2003/05/05 12:21:52 | MAY |
| G22 | EXCURSION | 2003/06/17 14:36:43 | JUNE |
| G23 | MOUNTAIN CLIMBING | 2003/08/15 08:22:16 | AUGUST |
| G24 | CULTURAL FESTIVAL | 2003/09/21 15:45:24 | SEPTEMBER |
| G25 | FIELD DAY | 2003/10/12 11:55:08 | OCTOBER |
| G26 | FIRST VISIT OF THE YEAR TO SHRINE | 2004/01/01 00:05:17 | JANUARY |
| G27 | THE EVE OF THE BEGINNING OF SPRING | 2004/02/03 17:34:26 | FEBRUARY |
| G28 | SPRING SKIING | 2004/03/25 13:02:35 | MARCH |

FIG. 19

| IMAGE NUMBER | IMAGE CONTENT | ACQUISITION TIME | TIME INFORMATION | SPECIFIED TIME INFORMATION |
|---|---|---|---|---|
| G30 | BIRTH | 1980/09/07 08:12:38 | 0 | SEPTEMBER |
| G31 | ENTER KINDERGARTEN | 1983/04/01 09:05:11 | 0.15 | APRIL |
| G32 | GRADUATE KINDERGARTEN | 1986/03/10 10:08:35 | 0.33 | MARCH |
| G33 | ENTER ELEMENTARY SCHOOL | 1986/04/01 09:32:18 | 0.33 | APRIL |
| G34 | GRADUATE ELEMENTARY SCHOOL | 1992/03/09 01:12:26 | 0.6 | MARCH |
| G35 | ENTER JUNIOR HIGH SCHOOL | 1992/04/01 09:18:52 | 0.6 | APRIL |
| G36 | GRADUATE JUNIOR HIGH SCHOOL | 1995/03/25 10:25:36 | 0.75 | MARCH |
| G37 | ENTER SENIOR HIGH SCHOOL | 1995/04/07 09:02:12 | 0.75 | APRIL |
| G38 | GRADUATE SENIOR HIGH SCHOOL | 1998/03/05 11:23:31 | 0.9 | MARCH |
| G39 | ENTER UNIVERSITY | 1998/04/10 09:29:25 | 0.9 | APRIL |
| G40 | ADULT | 2000/01/15 11:38:27 | 1 | JANUARY |

Related Art

LAYOUT ELEMENT ARRANGING DEVICE, LAYOUT ELEMENT ARRANGING METHOD, LAYOUT ELEMENT ARRANGING PROGRAM, COMPUTER READABLE RECORDING MEDIUM, AND ELECTRONIC APPARATUS

BACKGROUND

Aspects of the invention can relate to a layout element arranging device for arranging layout elements having directions such as characters, illustrations, still images, and moving images, a layout element arranging method for the layout element arranging device, a layout element arranging program which makes a computer perform a process of the layout element arranging method, a computer readable recording medium having recorded therein the layout element arranging program, and an electronic apparatus.

FIG. 20 shows related art layout elements, and FIG. 21 shows a related art path. To facilitate the explanation and understanding of the related art layout element arranging method, it is assumed that four successive motion images 101a, 101b, 101c, and 101d are arranged in a space 100, such as a computer display, and a print paper for printers, as shown in FIG. 20. The images 101a to 101d represent a short-distance race one after another, and indicate 'START', 'TUMBLE', 'RECOVER' and 'GOAL', respectively. In addition, the images 101a to 101d are specified by the above motions or have estimated moving directions, respectively. For example, the image 101a representing a player that starts to move toward the right side has a 'RIGHT' direction and the image 101c representing a player that continuously moves toward the left side has a 'LEFT' direction.

In the related art layout element arranging method, a path 201 is used as shown in FIG. 21. Here, the path 201 can include seven arrangement points 202a to 202g in a space 200 corresponding to the space 100 shown in FIG. 20. Each of the arrangement points 202a to 202g described herein is a relay point (pass point) or an end point constituting a path 201. The path 201 has one direction for improving a feeling of being, liveliness and truthfulness to be reproduced by a plurality of successive layout elements for the arrangement points 202a to 202g totally and sequentially, and more specifically, has a reverse-N shaped direction. In addition, each of the arrangement points 202a to 202g has a direction, and more specifically, has a direction of substantial tangential line of the path 201. For example, the arrangement point 202a has a 'DOWN' direction and the arrangement point 202f also has a 'DOWN' direction.

In the related art layout element arranging method, four images 101a to 101d are arranged in the space 100 along the path direction 201, as shown in FIGS. 20 and 21. More specifically, the image 101a is arranged at the arrangement point 202a, the image 101b is arranged at the arrangement point 202b, the image 101c is arranged at the arrangement point 202f, and the image 101d is arranged at the arrangement point 202g.

SUMMARY

However, according to the related art layout element arranging method, the directions of the images 101a, 101b, 101c and 101d and the directions of the arrangement points 202a, 202b, 202f and 202g where the images are arranged may not be matched. For example, the direction of the image 101a may be 'RIGHT' while the direction of the arrangement point 202a where the image 101a is arranged is 'DOWN'.

Also, the direction of the image 101c may be 'LEFT' while the direction of the arrangement point 202f where the image 101c is arranged is 'DOWN'. As a result, there can occur a problem in that eye flow chasing the images 101a to 101d arranged at the path may not be natural and that the feeling of being, liveliness and truthfulness that should be shown when four successive images 101a to 101d are rightly arranged cannot be fully obtained.

According to an aspect of the invention, there can be provided a layout element arranging device that includes a first selection for selecting one path from L paths (where L is a positive integer) having M arrangement points (where M is a positive integer specific to each path), and a second selection for selecting one layout element to arrange the one layout element among N layout elements (where N is any positive integer) to one arrangement point among the M arrangement points of the selected one path.

In the exemplary layout element arrangement according to the invention described above, the first selection can be performed such that the one path is selected from the L paths, and the second selection is performed such that the one layout element is selected among the N layout elements for the one arrangement point of the one path selected by the first selection. Therefore, the one layout element matched to the one arrangement point of the one path can be arranged. Accordingly, eye flow chasing the layout elements arranged at the M arrangement points may be natural for sense of time and that the feeling of being, liveliness and truthfulness can be fully obtained.

In the exemplary layout element arrangement according to the invention described above, each of the M arrangement points may have first information indicating a time concerning a position of the arrangement point of the one path, and each of the N layout elements may have second information indicating a time concerning the one layout element of the N layout elements, and the second selection may be performed such that the one layout element is selected based on the first information of the one arrangement point and the second information of the N layout elements.

According to the layout element arrangement of the invention described above, the second selection can be performed such that the one layout element is selected based on the time concerning a position of each arrangement points for the one path, indicated by the first information, and the time concerning each layout element for the N layout elements, indicated by the second information. Accordingly, eye flow chasing the layout elements arranged at each arrangement point for the path may be natural for sense of time.

In the layout element arrangement according to the invention described above, the second selection may be performed such that a layout element having the time indicated by the second information closest to the time indicated by the first information of the one arrangement point is selected as the one layout element.

According to the exemplary layout element arrangement of the invention described above, the second selection can be performed such that a layout element having the time indicated by the second information closest to the time indicated by the first information of the one arrangement point is selected as the one layout element. In other words, the time indicated by the second information of the related layout element is closest one to the time indicated by the first information of the one arrangement point. Accordingly, eye flow chasing the layout elements arranged at each arrangement point for the path may be natural for sense of time.

In the layout element arrangement according to the invention described above, each of the M arrangement points may have first information indicating a direction specified by a shape of the path of the arrangement point, each of the N layout elements may have second information indicating a direction specified by a content of the layout element, and the second selection may be performed such that the one layout element is selected based on the first information of the one arrangement point and the second information of the N layout elements.

According to the exemplary layout element arrangement of the invention described above, the second selection is performed such that the one layout element can be selected based on the direction of each arrangement point indicated by the first information and the direction of each layout element indicated by the second information. Accordingly, eye flow chasing the layout elements arranged at each arrangement point for the path may be natural.

In the layout element arrangement according to the invention described above, the second selection may be performed such that a layout element having a direction indicated by the second information of the one arrangement point closest to the direction indicated by the first information is selected as the one layout element.

According to the exemplary layout element arrangement of the invention described above, the second selection can be performed such that a layout element having a direction indicated by the second information of the one arrangement point closest to the direction indicated by the first information is selected as the one layout element. Accordingly, eye flow chasing the layout elements arranged at each arrangement point for the path may be natural.

In the exemplary layout element arrangement according to the invention described above, each of the M arrangement points may have first information indicating a time concerning a position of the arrangement point of the one path and second information indicating a direction specified by a shape of the path of the arrangement point, each of the N layout elements may have third information indicating a time concerning the one layout element of the N layout elements and fourth information indicating a direction specified by a content of the layout element, and the second selection may be performed such that a layout element is selected based on the first and second information of the one arrangement point and the third and fourth information of the N layout elements, as the one layout element.

In the exemplary layout element arrangement according to the invention described above, the second selection can be performed such that a layout element having the time indicated by the third information and the direction indicated by the fourth information which are closest to the time indicated by the first information and the direction indicated by the second information is selected as the one layout element.

In the layout element arrangement according to the invention described above, the time concerning the position of the arrangement point may be relatively specified by the position of the arrangement point of the one path.

In the layout element arrangement according to the invention described above, the time concerning the position of the arrangement point may be absolutely specified by the position of the arrangement point of the one path.

According to another aspect of the invention, there can be provided a layout element arranging program which makes a computer, having a first selection unit and a second selection unit, perform arrangement of layout elements to arrangement points of paths. The layout element arranging program can include a first selection step of making the first selection unit select one path from L paths (where L is a positive integer) having M arrangement points (where M is a positive integer specific to each path), and a second selection step of making the second selection unit select one layout element to arrange the one layout element among N layout elements (where N is any positive integer) to one arrangement point among the M arrangement points of the selected one path.

In the exemplary layout element arranging program according to the invention described above, each of the M arrangement points may have first information indicating a time concerning a position of the arrangement point of the one path, each of the N layout elements may have second information indicating a time concerning the one layout element of the N layout elements, and, in the second selection step, the one layout element may be selected based on the first information of the one arrangement point and the second information of the N layout elements.

In the exemplary layout element arranging program according to the invention described above, each of the M arrangement points may have first information indicating a direction specified by a shape of the path of the arrangement point, each of the N layout elements may have second information indicating a direction specified by a content of the layout element, and, in the second selection step, a layout element may be selected based on the first information of the one arrangement point and the second information of the N layout elements, as the one layout element.

In the layout element arranging program according to the invention described above, each of the M arrangement points may have first information indicating a time concerning a position of the arrangement point of the one path and second information indicating a direction specified by a shape of the path of the arrangement point, each of the N layout elements may have third information indicating a time concerning the one layout element of the N layout elements and fourth information indicating a direction specified by a content of the layout element, and, in the second selection step, a layout element may be selected based on the first and second information of the one arrangement point and the third and fourth information of the N layout elements, as the one layout element.

According to another aspect of the invention, there can be provided a computer readable recording medium having thereon a layout element arranging program.

According to another aspect of the invention, there can be provided an electronic apparatus including a first selection unit for selecting one path from L paths (where L is a positive integer) having M arrangement points (where M is a positive integer specific to each path), and a second selection unit for selecting one layout element to arrange the one layout element among N layout elements (where N is any positive integer) to one arrangement point among the M arrangement points of the selected one path.

In the exemplary electronic apparatus according to the invention described above, a path input unit for inputting the L paths may be further included.

In the exemplary electronic apparatus according to the invention described above, a layout element input unit for storing the N layout elements may be further included.

In the exemplary electronic apparatus according to the invention described above, a path storage unit for storing the L paths may be further included.

In the exemplary electronic apparatus according to the invention described above, an image display unit for displaying arrangement of one layout element of the N layout elements to each of the M arrangement points of the one path may be further included.

BRIEF DESCRIPTION OF THE DRAWINGS

The invention will be described with reference to the accompanying drawings, wherein like numerals reference like elements, and wherein:

FIG. 5 is a diagram illustrating information of the path according to an exemplary embodiment of the invention;

FIG. 6 is a diagram illustrating information of the image according to an exemplary embodiment of the invention;

FIG. 12 is a diagram illustrating paths according to an exemplary embodiment of the invention;

FIG. 13 is a diagram illustrating images according to an exemplary embodiment of the invention;

FIG. 17 is a diagram illustrating information concerning an image according to an exemplary embodiment of the invention;

FIG. 19 is a diagram illustrating information of another image according to an exemplary embodiment of the invention;

DETAILED DESCRIPTION OF EMBODIMENTS

A layout element arranging device according to preferred embodiments of the invention will now be described with reference to the drawings.

Figure 1A:
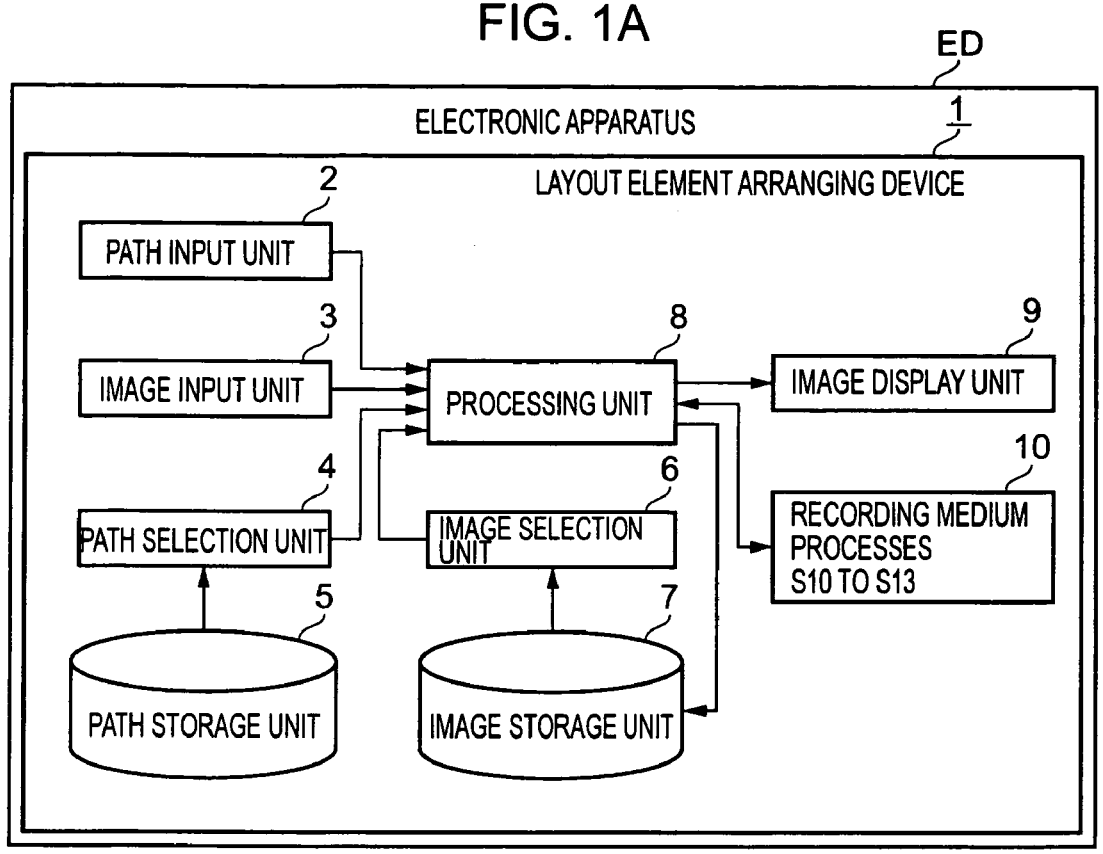
FIGS. 1A and 1B are a diagrams illustrating a configuration of a layout element arranging device according to an exemplary embodiment of the invention.
Figure 1B:
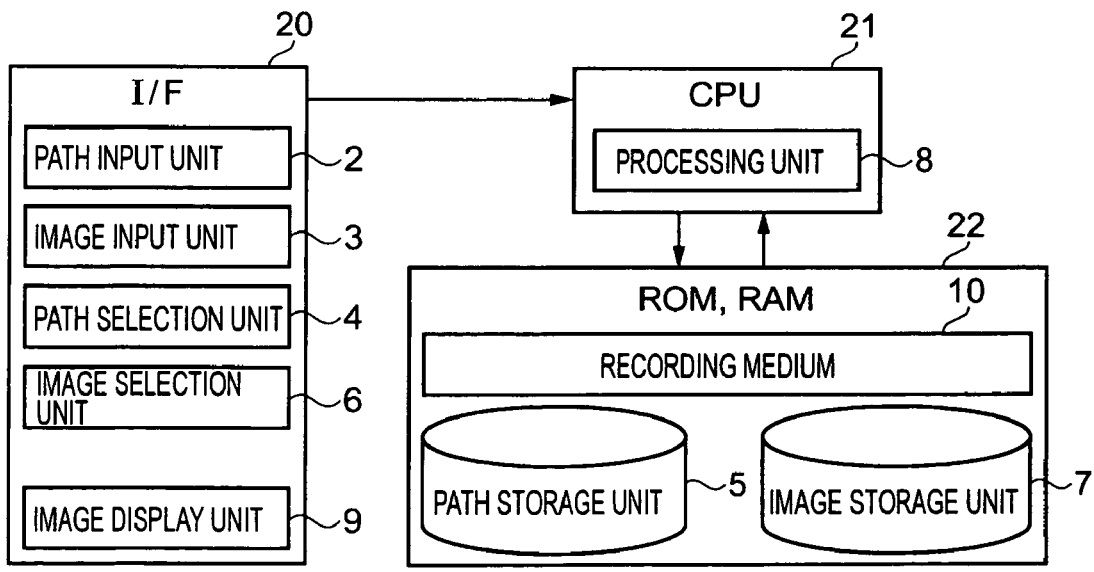
Figure 2:
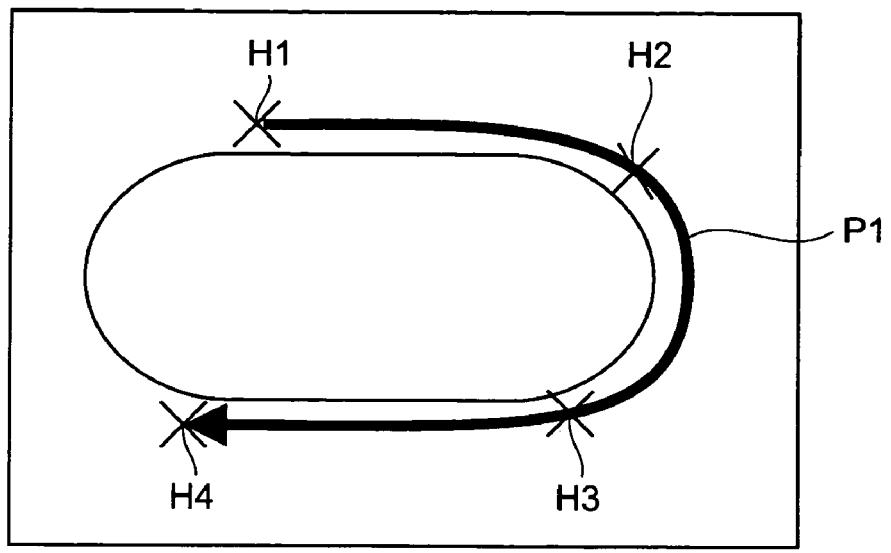
FIG. 2 is a diagram illustrating paths according to an exemplary embodiment of the invention.
Figure 3:
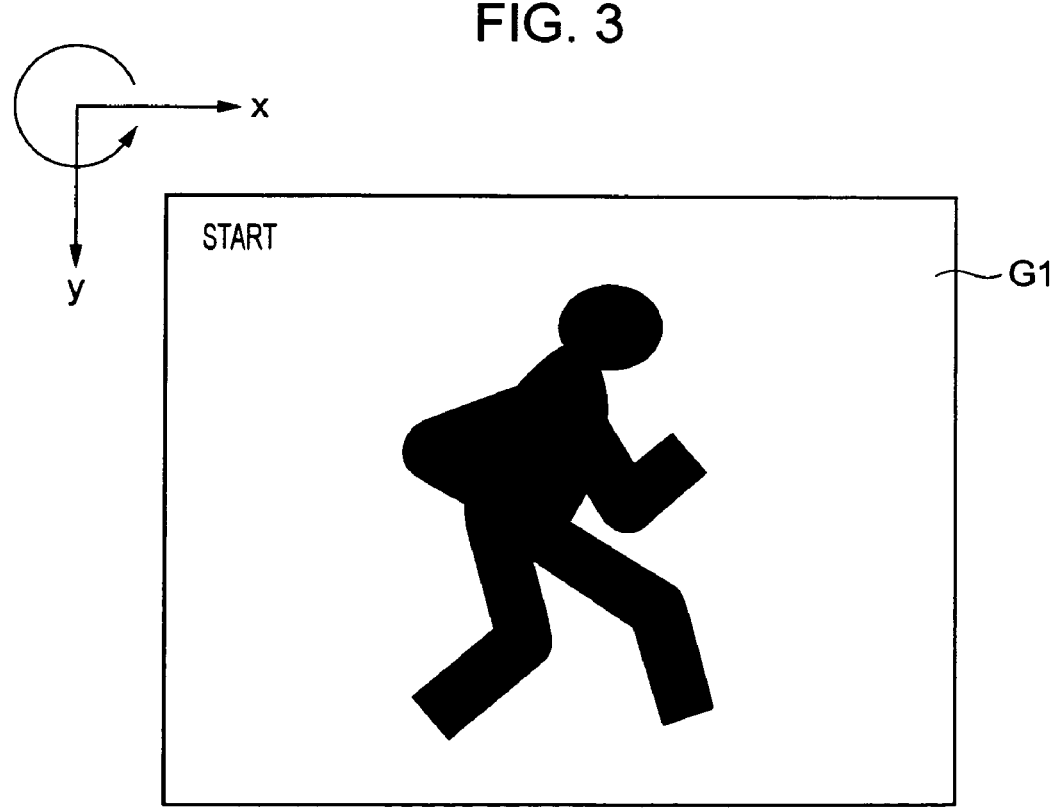
FIG. 3 is a diagram illustrating images according to an exemplary embodiment of the invention.
Figure 4:
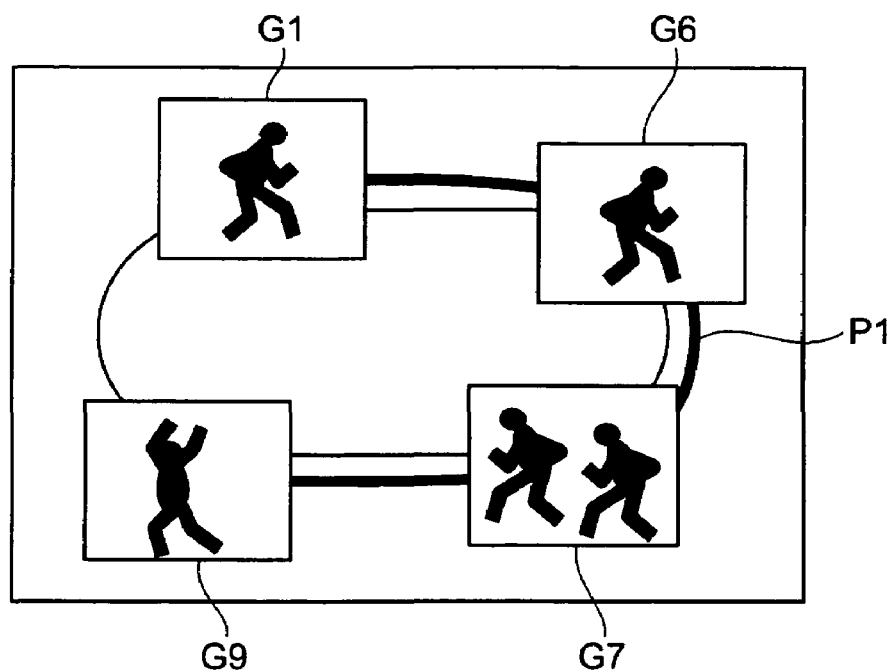
FIG. 4 is a diagram illustrating an arrangement state of the images according to an exemplary embodiment of the invention.

FIGS. 1A and 1B show an exemplary configuration of a layout element arranging device of a exemplary embodiment 1, FIG. 2 shows a path of images to be arranged by the layout element arranging device of the exemplary embodiment 1, FIG. 3 shows an image to be arranged in the path by the layout element arranging device of the exemplary embodiment 1, FIG. 4 is a state where the image is arranged on the path by means of the layout element arranging device of the exemplary embodiment 1, FIG. 5 shows information concerning the path of the exemplary embodiment 1, and FIG. 6 shows information concerning the image of the exemplary embodiment 1.

A layout element arranging device 1 of the exemplary embodiment 1 (hereinafter, referred to as a 'device 1') is provided in electronic apparatuses ED, such as personal computers, PDAs (Personal Digital Assistance), KIOSK terminals, printers (multi function machine), media servers, photo viewers, and digital cameras. The layout element arranging device 1 arranges four images, starting from G1 shown in FIG. 3 among N images G1 to G9 (where N is any positive integer, here, N=9 (FIG. 6)) into M arrangement points H1, H2, H3, and H4 (where M is a specific positive number, in here, M=4 (FIG. 5)) on a path P1 shown in FIG. 2, i.e., one path among L paths (where L is any positive integer, here, L=6 (FIG. 5)), in order to arrange four images G1, G6, G7, and G9 into four arrangement points H1 to H4 on the same path P1 as shown in FIG. 4.

Here, as shown in FIG. 5, the arrangement points M of the paths P2 to P6 other than the path P1 are 4, 5, 7, 8, and 7, respectively.

To achieve the above object, as shown in FIG. 1A, the device 1 can include a path input unit 2, an image input unit 3, a path selection unit 4, a path storage unit 5, an image selection unit 6, an image storage unit 7, a processing unit 8, and an image display unit 9, and a recording medium 10. In the following description, a coordinate (X, Y) designates rightward as a positive in X and downward as a positive in Y, as shown in FIG. 3. In addition, the directions of an image and an arrangement point are represented counterclockwise starting with the positive direction of X (number 0), with a cross point of the X-axis and the Y-axis shown in FIG. 3 as a center.

In FIG. 1A, the path input unit 2, such as a keyboard or a mouse, is used for a user of a device 1 to input paths P1 to P6 shown in FIG. 5. The input paths P1 to P6 are stored in the path storage unit 5.

The image input unit 3, such as a scanner, a digital camera, or a video camera, is used for the user to input the images G1 to G9 as shown in FIG. 6. The input images G1 to G9 are stored in the image storage unit 7.

The path selection unit 4, such as a keyboard or a mouse, is used for the user to select a desired path, e.g., the path P1, from the paths P1 to P6 stored into the path storage unit 5.

The path storage unit 5, such as a hard disk or a CD-ROM, stores the paths P1 to P6 input from the path input unit 2, as described above.

More specifically, the path storage unit 5 stores a path number, a path shape, an arrangement point number, a coordinate, and time information for the paths P1 to P6, as shown in FIG. 5. The path storage unit 5 has a path number of 'P1', a path shape of '⊃', and four arrangement points H1, H2, H3, and H4 for the path P1, for example. In addition, coordinates of the arrangement points H1 to H4 and time information are stored as (50, 30), 0; (180, 60), 0.4; (150, 180), 0.7; and (30, 190), 1. Here, 'time information' refers to information concerning a position of the arrangement point for the path. More specifically, it represents a relative difference between a start point of the path and the arrangement point to the start point and the end point of the path. For example, time information 0.4 of the arrangement point H2 of the path P1 represents a difference (line length) from the arrangement point H1 to the arrangement point H2, When a line segment between the arrangement point H1, or the start point, and the arrangement point H4, or the end point, for the start point and end point is normalized to have a length of 1.

Returning to FIG. 1A, the image selection unit 6 is configured in the same manner as the path selection unit 4. In other words, the image selection unit 6, such as a keyboard and a mouse, is used for the user to select a desired image from the images G1 to G9 stored into the image storage unit 7.

The image storage unit 7 can be configured in the same manner as the path storage unit 5. In other words, the image storage unit 7, such as a hard disk or a CD-ROM, is used to store the images G1 to G9 input from the image input unit 3, as described above. More specifically, the image storage unit 7 can store an image number, an image content, an acquisition time, and time information for the images G1 to G9, as shown in FIG. 6. The image storage unit 7 stores an image number of 'G1', an image content of 'START', an acquisition time of 'Sep. 15, 2003 09:09:23', and time information of '0' for the image number G1, for example. Here, 'time information' refers to information concerning a position of the image for the 9 images. More specifically, it represents a relative difference between the first images and the last image of the 9 images G1 to G9 to the distance from the first image to the corresponding image. For example, time information 0.05 of time information G2 represents a difference from the first image, or the image G1, to the corresponding image G2, when a time difference between the first image, the image G1, and the last image, or the image G9 is normalized to have a length of 1.

Returning to FIG. 1A, the processing unit 8 (corresponding to the first and second selection units) is, for example, a CPU (central processing unit). The processing unit 8 selects images that should be arranged at the arrangement points H1 to H4 on, for example, the path P1, the path selected by the path selection unit 4 among 6 paths P1 to P6 stored in the path storage unit 5, by comparing time information of the arrangement points H1 to H4 with time information of a plurality of images selected by the image selection unit 6.

The image display unit 9, such as a CRT (cathode ray tube) monitor and a liquid crystal monitor, display a message required for user to manipulate 6 paths P1 to P6, 9 images G1 to G9, the path input unit 2, the image input unit 3, the path selection unit 4, and the image selection unit 6.

The recording medium 10 is, for example, a flexible diskette, a CD-ROM, a memory card, a hard disk, and a storage medium included in a portable terminal with respect to an interface (I/F) 20 and ROM or RAM 22 to be described below. A program performing a processing (steps S10 to S13 described below) by the processing unit 8 having the computer (CPU) is stored in the recording medium 10 ng unit 8.

The device 1 of the exemplary embodiment can include the path input unit 2, the image input unit 3, the path selection unit 4, the image selection unit 6, and the image display unit 9, as the interface (I/F) 20, as conceptionally shown in FIG. 1B. The CPU 21 can include the processing unit 8, the ROM or RAM 22 comprises the recording medium 10, the path storage unit 5, and the image storage unit 7.

Figure 7:
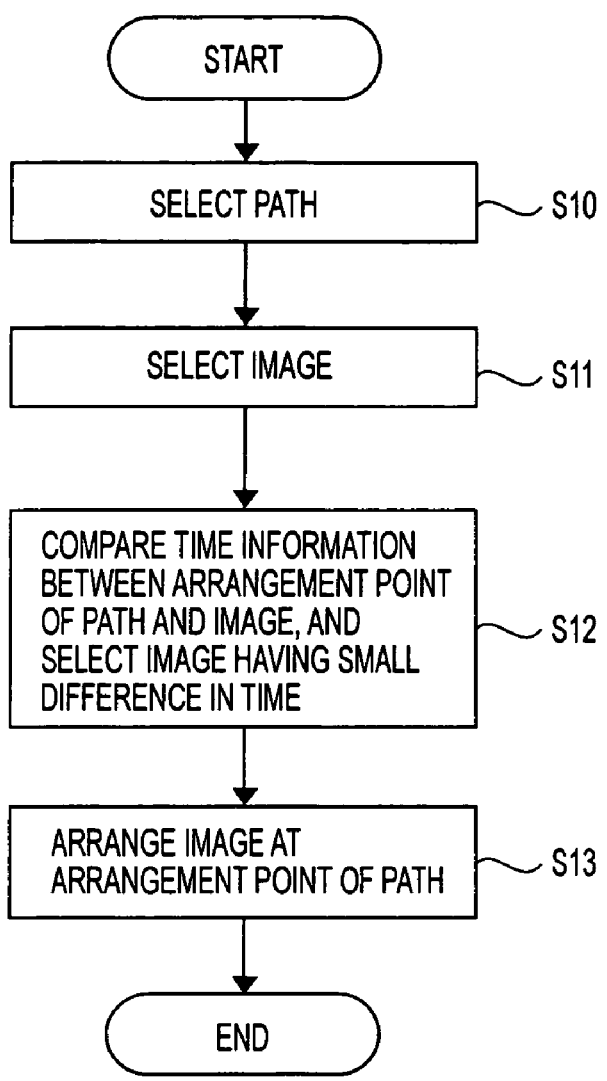
FIG. 7 is a flow chart illustrating operation of a layout element arranging device according to an exemplary embodiment of the invention.

FIG. 7 is a flow chart illustrating an exemplary operation of the device of the exemplary embodiment 1. In the following description, to provide explanation and understanding, it is assumed that the 6 paths P1 to P6 input from the path input unit 2 are previously stored into the path storage unit 5, and information concerning the 9 images G1 to G9 input from the image input unit 3 is previously stored into the image storage unit 7.

Figure 8:
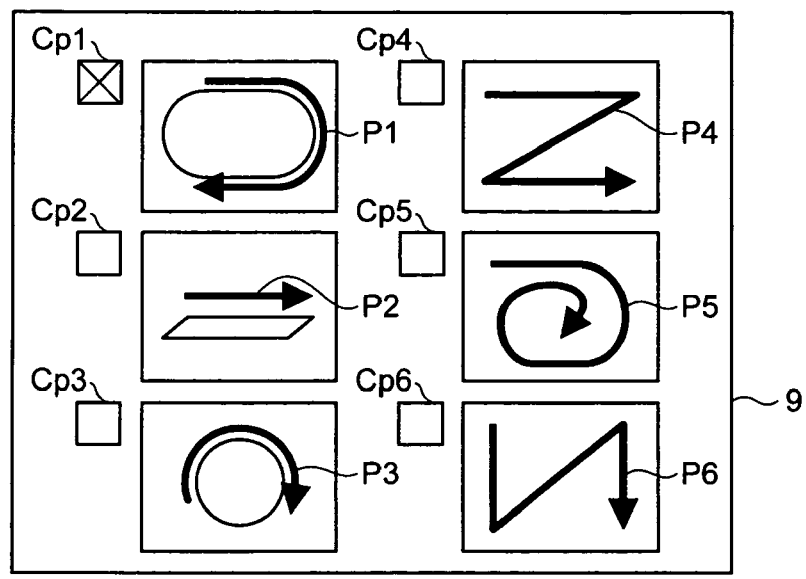
FIG. 8 is a diagram illustrating paths according to an exemplary embodiment of the invention.

Step S10: the image display unit 9 displays the 6 paths P1 to P6 stored in the path storage unit 5, in 3 rows and 2 columns, as shown in FIG. 8. Further, the image display unit 9 also displays check boxes Cp1 to Cp6 for selecting the paths P1 to P6. Thus, the user of the device 1 selects the check box Cp1 using the path selection unit 4, i.e., checks a mark 'x', in order to select the path P1 as a favorite path, in response to the display of the paths P1 to P6 and the check boxes Cp1 to Cp6.

Figure 9:
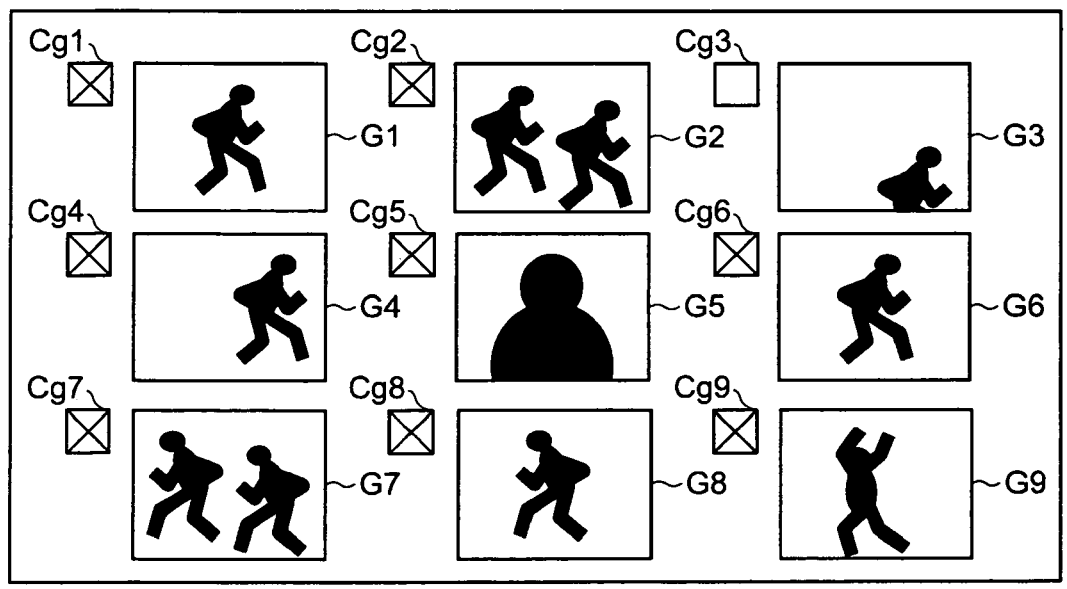
FIG. 9 is a diagram illustrating selection of a still image according to an exemplary embodiment of the invention.

Step S11: the image display unit 9 displays the 9 images G1 to G9, which are still images, obtained by the digital camera and stored in the image storage unit 7, in 3 rows and 3 columns, as shown in FIG. 9. Further, the image display unit 9 also displays check boxes Cg1 to Cg9 for selecting the images G1 to G9. Thus, the user uses the image selection unit 6 to select check boxes Cg1, Cg2, Cg4, Cg5, Cg6, Cg7, Cg8, and Cg9 (excluding the check box Cg3) as favorite images, in order to select images G1, G2, G4, G5, G6, G7, G8, and G9 (excluding the image G3), in response to the corresponding images G1 to G9 and the check boxes Cg1 to Cg9.

Figure 10:
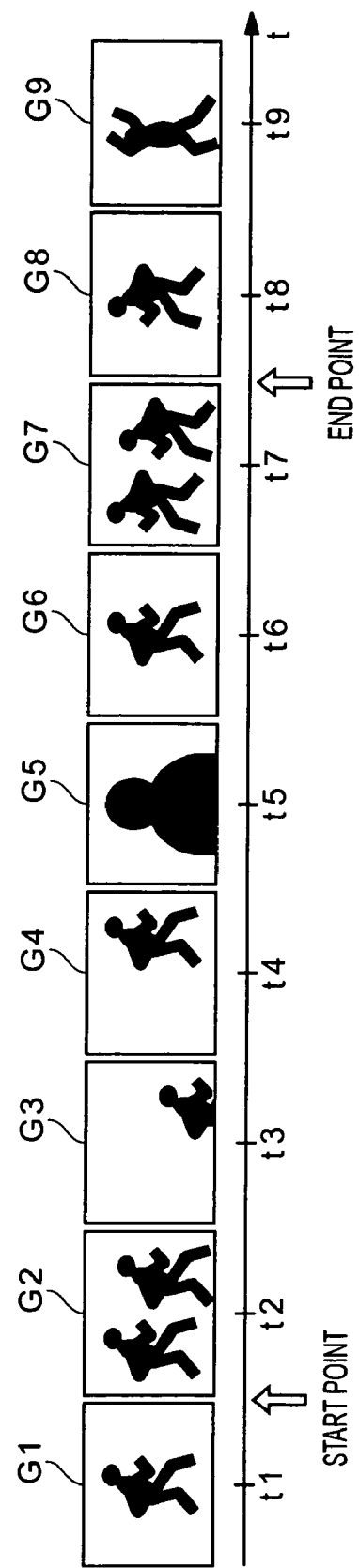
FIG. 10 is a diagram illustrating selection of a scenes from a movie according to an exemplary embodiment of the invention.

Instead of using the check boxes Cg1 to Cg9 mentioned above referring to FIG. 9, the desired images, for examples, the images G2 to G7 among the 9 images G1 to G9, which is scenes from a movie obtained by the video camera, may be selected as shown in FIG. 10, not by selecting the desired G1, G2, and G4 to G9, but by manipulating a start point for designating the initial position or the initial point and an end point for designating the end position or the end scenes to be selected by the image selection unit 6.

Step S12: the processing unit 8 can refer to the path storage unit 5. For the 4 arrangement points H1 to H4 on the path P1 selected in the step S10, time information 0, 0.4, 0.7, 1 is acknowledged as shown in FIG. 5. Further, the processing unit 8 refers to the image storage unit 7. Thus, for 8 images G1, G2, and G4 to G9 selected in the step S11, time information 0, 0.05, 0.25, 0.33, 0.45, 0.72, 0.9, and 1 is acknowledged as shown in FIG. 6.

The processing unit 8 compares time information of the arrangement points H1 to H4 of the path P1 with time information of the images G1, G2, and G4 to G9 to select the images where time information is equal or similar, or the images having no or little time difference, as images to be arranged at the arrangement points. Specifically, for example, after comparing time information '0' of the arrangement point H1 with time information '0', '0.05', '0.25', '0.33', '0.45', '0.72', '0.9', and '1' of the images G1, G2, and G4 to G9, the image G1 having time information of '0' is selected as an image to be arranged at the arrangement point having time information of '0'. Likewise, the image G6 having time information of '0.45' is selected for the arrangement point H2 having time information of '0.4', the image G7 having time information of '0.72' is selected for the arrangement point H3 having time information of '0.7', and the image G9 having time information '1' is selected for the arrangement point H4 having time information of '1'. In other words, the processing unit 8 selects the images G1, G6, G7, and G9 as images to be arranged at the arrangement points H1 to H4 of the path 1.

Step S13: the processing unit 8 arranges the four images G1, G6, G7, and G9 selected in the step S12, into the four arrangement points H1 to H4 on the path P1. With this, as shown in FIG. 4, the images G1, G6, G7, and G9 are arranged at the arrangement points H1 to H4 on the path P1. Thus, the image display unit 9 displays the four images G1, G6, G7, and G9 arranged at the arrangement points H1 to H4 on the path P1, as shown in FIG. 4.

As described above, in the device 1 of the first exemplary embodiment, the processing unit 8 can compare time information of the arrangement points H1 to H4 of the path P1 with time information of the images G1, G2, and G4 to G9. In other words, by comparing the arrangement points H1 to H4 with the images G1, G2, and G4 to G9 in terms of time information, appropriate images G1, G6, G7, and G9 are selected and arranged at the arrangement points H1 to H4 from the temporal aspect. Accordingly, eye flow chasing the images G1, G6, G7, and G9 arranged on the path P1 can be natural compared to the prior art.

Figure 11:
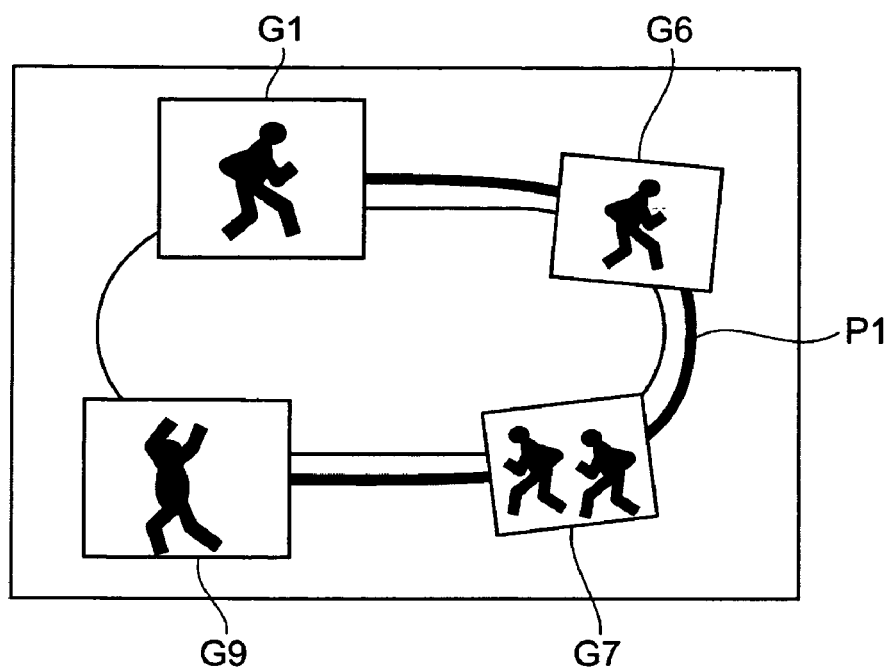
FIG. 11 is a diagram illustrating another arrangement of state of the images according to an exemplary embodiment of the invention.

The path storage unit 5 preferably stores information concerning the arrangement points H1 to H4 shown in FIG. 5, in addition to a size or a slope required for the images to be arranged at the arrangement points H1 to H4. When the images are arranged in the step S13 of FIG. 7, size and angle information of the image is used. Specifically, as the sizes and angles of the images G1, G6, G7, and G9 are changed, as shown in FIG. 11, arrangement having improved liveliness and trustfulness can be obtained when compared to the arrangement shown in FIG. 4.

In the step S12 of FIG. 7, instead of selecting the images G6 having time information '0.45' closest to time information of the arrangement point H2 as an image arranged at the arrangement point H2, for example, the processing unit 8 may select either of the related image G6 and the image G5 having time information of '0.33' relatively close to the related image G6 the time information '0.4'0, on the basis of selecting (1) an image located temporally earlier, (2) an image having a better image quality, or (3) an image having a balanced separation in time from the images to be arranged at the arraigning points H1, H3 adjacent to the arrangement point H2.

Instead of selecting the image G1 having time information '0' matched to time information '0' of the arrangement point H1 as an image to be arranged at the arrangement point H1, or the start point of the path P1, the processing unit 8 may select the image G1, or the first image among the images G1, G2, and G4 to G9 without comparing time information '0' of the arrangement point H1 with time information '0' of the image G1. In the same manner, instead of selecting the image G9 having time information '1' matched to time information '1' of the arrangement point H4 as an image to be arranged at the arrangement point H4, or the end point of the path P1, the processing unit 8 may select the image G9, or the last image among the images G1, G2, and G4 to G9 without comparing time information '1' of the image G9 with time information '1' of the arrangement point H4.

A layout element arranging device of a second exemplary embodiment will now be described. The layout element arranging device according to this exemplary embodiment (hereinafter, referred to as a 'device') can include the path input unit 2 to the recording medium 10, having the same configuration and function as those of the device 1 of the exemplary embodiment 1 shown in FIGS. 1A and 1B. Further, the path storage unit 5 and the image storage unit 7 of the exemplary embodiment 2 store different information from the path storage unit 5 and the image storage unit 7 of the first exemplary embodiment.

FIG. 12 shows information concerning a path stored in the path storage unit. The path storage unit 5 stores a path number, a path shape, an arrangement point number, and a coordinate for the paths P1 to P6, in the same manner as the first exemplary embodiment, as shown in FIG. 12. Further, contrary to the first exemplary embodiment, information concerning a direction instead of a time in the exemplary embodiment is stored. The path storage unit 5 has a path number of 'P1', a path shape of ' ⊃ ', and four arranging points H1 to H4 for the path P1, for example. In addition, coordinates of the arrangement points H1 to H4 and directional information are stored as (50, 30), 0; (180, 60), 315; (150, 180), 195; and (30, 190), 180. Here, directional information refers to information concerning a direction (including one direction as well as no direction and a plurality of directions) to be designated by the shape of the path at the arrangement points. For example, directional information '0' of the arrangement point H1 of the path P1 represents 'RIGHT' tangential direction of the path P1 at the arrangement point H1, and direction information '315' of the arrangement point H2 of the path P1 represents 'SLOW RIGHT-DOWNWARD' tangential direction of the path P1 at the arrangement point H2.

FIG. 13 shows information concerning images stored in the image storage unit. As shown in FIG. 13, the image storage unit 7 stores an image number, image content, and an acquisition time for the images G1 to G9, as in the exemplary embodiment 1. Further, contrary to the first exemplary embodiment, the image storage unit 7 stores directional information instead of time information of the first exemplary embodiment. The image storage unit 7 stores an image number of 'G1', an image content of 'START', an acquisition time of 'Sep. 15, 2003 09:09:23', and directional information of '0' for the image number G1, for example. Here, 'directional information' refers to information concerning a direction designated by the image content. For example, directional information '0' of the image G1 represents 'RIGHT' direction that is designated based on the content of the image G1, and direction information '350' of the image G2 represents 'SLOW RIGHT-DOWNWARD' direction that is designated based on the content of the image G2. The 'direction of the image' to be indicated by image information is extracted in advance from each image, on the basis of, for example, (1) temporal and relative positional relationship between a moving object and a still background, (2) an optical flow, or (3) characteristic or feature of the moving or still object in its nature (e.g., facial direction or an acute angle of a triangle).

Figure 14:
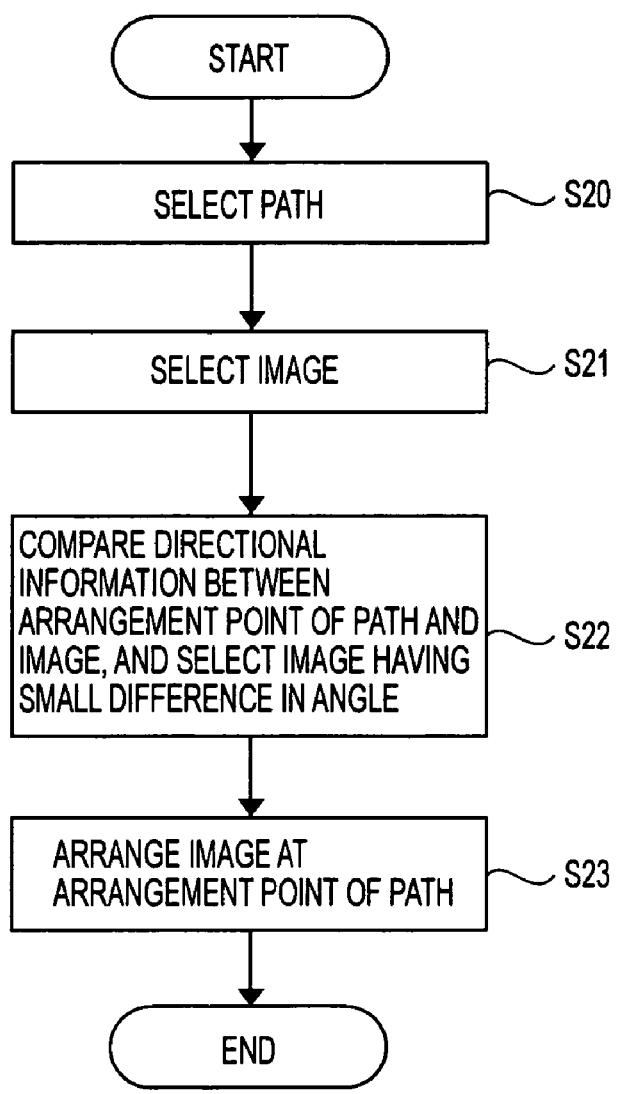
FIG. 14 is a flow chart illustrating operation of a layout element arranging device according to an exemplary embodiment of the invention.

FIG. 14 is a flow chart illustrating an exemplary operation of the device of the second exemplary embodiment. Operation of the device according to the exemplary embodiment 2 will now be described with reference to FIG. 14.

Step S20: as in the step S10 of the first exemplary embodiment, the image display unit 9 displays the paths P1 to P6 and check boxes Cp1 to Cp6, as shown in FIG. 8. Thus, the user of the device selects the check box Cp1 using the path selection unit 4 to select the path P1 as a favorite path, in response to the display.

Step S21: as in the step S11 of the first exemplary embodiment, the image display unit 9 displays the images G1 to G9 and check boxes Cg1 to Cg9, as shown in FIG. 9. In addition, after the images G1 to G9 are displayed, as shown in FIG. 9, the user selects the user favorite images G1, G2, and G4 to G9 by selecting check boxes Cg1, Cg2, and Cg4 to Cg9 with the image selection unit 6, or manipulating the start point and the end point shown in FIG. 10, in response to the corresponding scenes G1 to G9 and the check boxes Cg1 to Cg9.

Step S22: the processing unit 8 refers to the path storage unit 5. For the 4 arrangement points H1 to H4 on the path P1 selected in the step S21, directional information 0, 315, 195, 180 is acknowledged as shown in FIG. 12. Further, the processing unit 8 refers to the image storage unit 7. Thus, for 8 images G1, G2, and G4 to G9 selected in the step S22, directional information 0, 350, 5, INDEFINITE, 0, 180, 190, and 185 is acknowledged as shown in FIG. 13. Here, 'INDEFINITE' refers to an undetermined direction at a coordinate system using the X-axis and the Y-axis shown in FIG. 3.

The processing unit 8 can compare directional information of the arrangement points H1 to H4 of the path P1 with directional information of the images G1, G2, and G4 to G9 to select the images where directional information is equal or similar, or the images having no or little time difference, as images to be arranged at the arrangement points. Specifically, for example, after comparing directional information '0' of the arrangement point H1 with directional information '0', '350', '5', 'IDEFINITE', '0', '180', '190', and '185' of the images G1, G2, and G4 to G9, the image G1 having directional information of '0' is selected as an image to be arranged at the arrangement point having directional information of '0'. Likewise, the image G2 having directional information of '350' is selected for the arrangement point H2 having directional information of '315', the image G8 having directional information of '190' is selected for the arrangement point H3 having directional information of '195', and the image G9 having directional information '185' is selected for the arrangement point H4 having directional information of '180'. In other words, the processing unit 8 selects the images G1, G2, G8, and G9 as images to be arranged at the arrangement points H1 to H4 of the path P1.

Figures 15, 16:
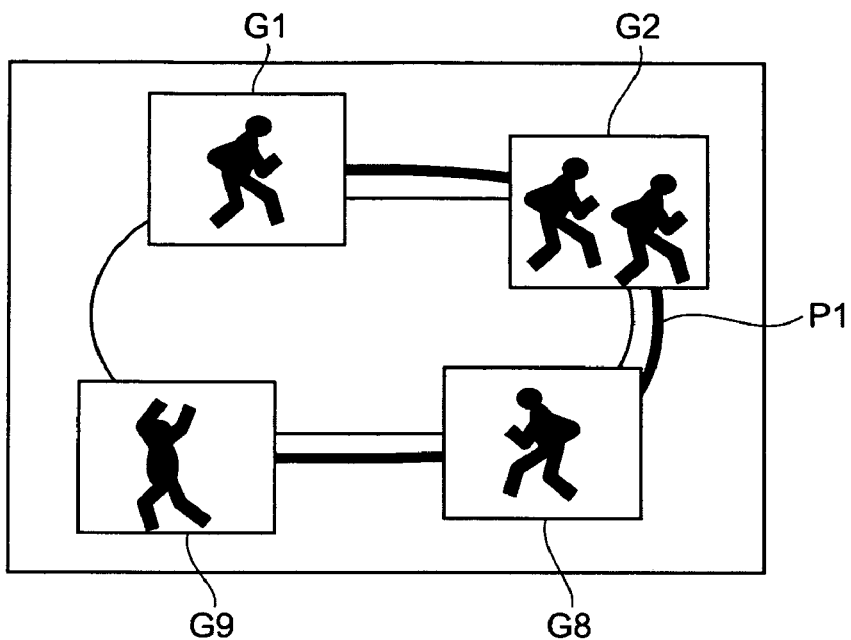
FIG. 15 is a diagram illustrating an arrangement state of the image according to an exemplary embodiment of the invention.
FIG. 16 is a diagram illustrating information concerning a path according to an exemplary embodiment of the invention.

Step S23: the processing unit 8 arranges the four images G1, G2, G8, and G9 selected in the step S22, into the four arrangement points H1 to H4 on the path P1. With this, as shown in FIG. 15, the images G1, G2, G8, and G9 are arranged at the arrangement points H1 to H4 on the path P1.

As described above, in the device of the second exemplary embodiment, the processing unit 8 can compare directional information of the arrangement points H1 to H4 of the path P1 with directional information of the images G1, G2, and G4 to G9. In other words, by comparing the arrangement points H1 to H4 with the images G1, G2, and G4 to G9 in terms of direction, appropriate images G1, G2, G8, and G9 are selected and arranged at the arrangement points H1 to H4 from the directional aspect. Accordingly, eye flow chasing the images G1, G2, G8, and G9 arranged on the path P1 can be natural compared with the prior art.

As similar to the device 1 of the modified example of the first exemplary embodiment, information concerning the size and angle of the image is used in the device of the second exemplary embodiment. The sizes and angles of the images G1, G2, G8, and G9 to be arranged at the arrangement points H1 to H4 may be changed. In addition, any of the plurality of images, or candidates of the images to be arranged at the one arrangement point of the arrangement points H1 to H4 may be selected on the afore-mentioned basis of (1) an image located temporally earlier, (2) an image having a better image quality, or (3) an image having a temporally balancing difference with the images to be arranged at the adjacent arraigning points. Further, it can be selected on the basis of (4) an image having a directionally balancing difference with the images to be arranged at the adjacent arraigning points. In addition, as images to be arranged at the arrangement points H1 and H4, or the start and end points of the path P1, the images G1 and G9, or the first and last images of the images G1, G2, and G4 to G9 may be primarily selected without comparing directional information of the arrangement points H1 and H4 with directional information of the images G1, G2, and G4 to G9.

In the device 1 of the first exemplary embodiment or the device of the second exemplary embodiment, instead of selecting the images arranged at the arrangement points H1 to H4 of the path P1 among the images G1, G2, and G4 to G9, in terms of one of time and direction, the device having two functions of selection in terms of both time and direction may select images to be arranged at the arrangement points H1 to H4 of the path P1 from the two aspect, i.e., time and direction. For example, as an image to be arranged at the arrangement point H3, the image G7 having time information of '0.72' and direction information of '180' synthetically closest to time information of '0.7' and directional information of '195' of the arrangement point H3 may be selected. In addition, by weighting either in terms of time or direction, selection prioritized from the time aspect or selection prioritized from the direction aspect may also possible.

A layout element arranging device according to a third exemplary embodiment will now be described. As similar to the device 1 of the first exemplary embodiment and the device of the second exemplary embodiment, the device of the exemplary embodiment can include the path input unit 2 to the recording medium 10. Further, contrary to the device 1 of the first exemplary embodiment and the device of the second exemplary embodiment, the path storage unit 5 stores information concerning the path shown in FIG. 16, instead of information concerning the path shown in FIGS. 5 and 12. In addition, the image storage unit 5 stores information concerning the image shown in FIG. 17, instead of information concerning the image shown in FIGS. 6 and 13.

More specifically, the path storage unit 5 stores a path number, a path shape, an arrangement point number, and a coordinate for the paths, in the same manner as the first and second exemplary embodiments, as shown in FIG. 16. Further, contrary to the first and second exemplary embodiments, information concerning specified time instead of the time and the direction is stored. The path storage unit 5 has a path number of 'P1', a path shape of '⊃', and four arranging points H1 to H4 for the path P1, for example. In addition, coordinates of the arrangement points H1 to H4 and specified time information are stored as (50, 30), MAY; (180, 60), AUGUST; (150, 180), OCTOBER; and (30, 190), DECEMBER. Here, 'specified time information' refers to a temporal condition required for an image to be arranged at the arrangement point, and designated by a relative position of the arrangement point on the path. For example, specified time information 'MAY' of the arrangement point H1 represents 'MAY' related things for the images to be arranged at the arrangement point H1.

As shown in FIG. 17, the image storage unit 7 stores an image number and an image content, as in the first and second exemplary embodiments, and an acquisition time as in the exemplary embodiment 1. Further, contrary to the first and second exemplary embodiments, the image storage unit 7 stores specified time information instead of time and direction information. The image storage unit 7 stores an image number of 'G20', an image content of 'ENTRANCE CEREMONY', and specified time information 'APRIL' designated from an acquisition time of 'Apr. 19, 2003, 09:40:27', for example. Here, 'specified time information' refers to a temporal condition required from the acquisition time of the images G20 to G28 that can be candidates to be arranged at the arrangement points H1 to H4. For example, specified time information 'APRIL' of the image G20 represents that the image G20 is related to 'APRIL'. From the acquisition time 'Apr. 19, 2003, 09:40:27' of the image G20, a month portion is extracted. In addition, in response to the image content, for example, when it is an 'ENTRANCE CEREMONY', specified time information such as 'APRIL' can be given. The image content given to a frame and a caption used in the image capturing may be employed.

The processing unit 8 of the exemplary embodiment 3 acknowledges specified time information of the arrangement points H1 to H4 of the path P1 and specified time information of the images G20 to G28 from the path storage unit 5 and the image storage unit 7, in the steps corresponding to the steps S10, S20, S11, and S21 of the first and second exemplary embodiments. Specifically, in the steps corresponding to the steps S12 and S22 of the first and second exemplary embodiments, by comparing two specified time information described above, the images to be arranged at the arrangement points H1 to H4 are selected. As an image to be arranged at the arrangement point H1, for example, the processing unit 8 selects a 'GOLDEN WEEK' of the image 21 having specified time information of 'MAY' from the fact that specified time information of the arrangement point H1 is 'MAY'. In addition, from the fact that specified time information of the arrangement point H2 is 'AUGUST', 'MOUNT CLIMBING' of the image G23 having specified time information of 'AUGUST' is selected as an image to be arranged at the arrangement point H2. Further, from the fact that specified time information of the arrangement point H3 is 'OCTOBER', 'FIELD DAY' of the image G25 having specified time information of 'OCTOBER' is selected as an image to be arranged at the arrangement point H3. In addition, from the fact that specified time information of the arrangement point H4 is 'JANUARY', 'FIRST VISIT OF THE YEAR TO SHRINE' of the image G26 having specified time information of 'JANUARY' close to specified time information 'DECEMBER' is selected as an image to be arranged at the arrangement point H4. In other words, the processing unit 8 selects 'GOLDEN WEEK' for the image G21, 'MOUNT CLIMBING' for the image G23, 'FIELD DAY' for the image G25, and 'FIRST VISIT OF THE YEAR TO SHRINE' for the image G26, as images to be arranged at the arrangement points H1 to H4 of the path P1.

As described above, in the device of the third exemplary embodiment, by comparing specified time information of the arrangement points H1 to H4 of the path P1 and specified time information of the images G20 to G28, the processing unit 8 selects images having specified time information same as or similar to specified time information of the arrangement points H1 to H4, as images to be arranged at the arrangement points H1 to H4. Accordingly, eye flow chasing the images arranged on the path P1 can be natural compared with the prior art. Further, by using images related to months and seasons, images concerning the annual ceremony can be naturally arranged.

Figure 18:
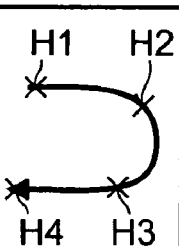
FIG. 18 is a diagram illustrating information of another path according to an exemplary embodiment of the invention.
Figure 20:
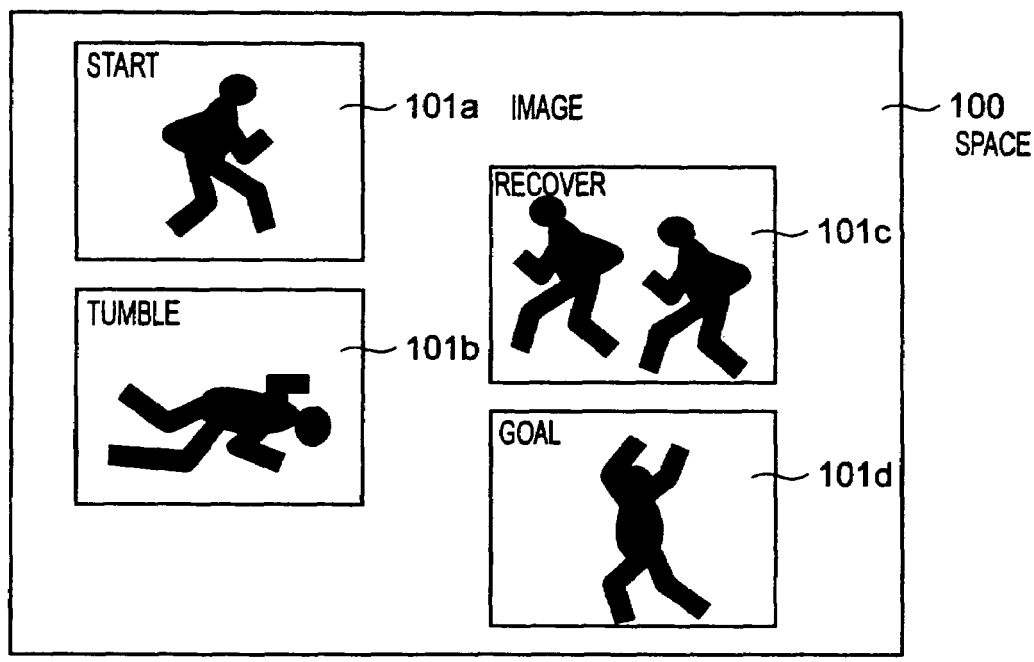
FIG. 20 is a diagram illustrating a related art layout element.
Figure 21:
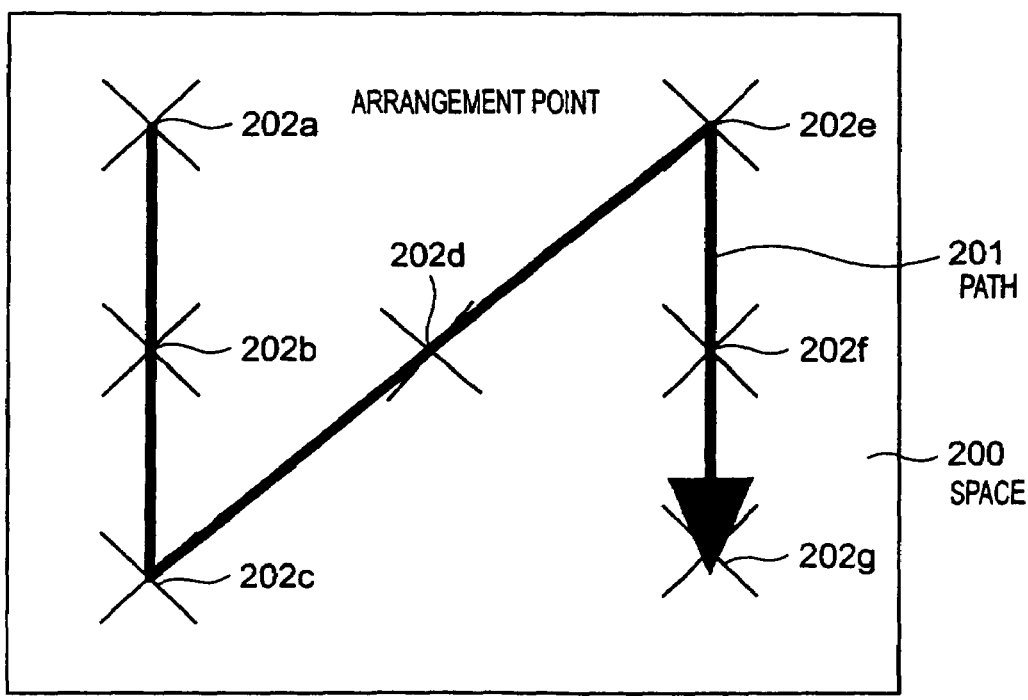
FIG. 21 is a diagram illustrating a related art path.

Instead of information concerning the path shown in FIG. 16, the path storage unit 5 stores information concerning the path shown in FIG. 18. Further, instead of information concerning the images shown in FIG. 17, the image storage unit 7 may store information concerning the images shown in FIG. 19. Here, 'time information' of the arrangement points shown in FIG. 18 is the same as 'time information' of the exemplary embodiment 1. Further, 'specified time information' unique to the corresponding modified example represents an absolute temporal condition required for images to be arranged at the arrangement points. For example, time information 0.3 of the arrangement point H2 of the path P1 represents a difference of '0.3' between the arrangement point H1 to the arrangement point H2. In addition, specified time information 'APRIL' of the arrangement point H2 represents that the image to be arranged at the arrangement point H2 should be related to 'APRIL' as an absolute temporal condition.

'Time information' of the image shown in FIG. 19 is the same as 'time information' of the first exemplary embodiment. In other words, time information is calculated from the acquisition time. Further, 'specified time information' unique to the corresponding modified example represents an absolute time specified by the image content or the acquisition time. For example, specified time information 'APRIL' of the image G33 represents that the absolute time specified by the content of the image G33 is related to 'APRIL'.

In the modified example of the third exemplary embodiment, in the steps corresponding to the steps S10, S20, S11, and S21 of the first and second exemplary embodiments, the processing unit 8 acknowledges time information and specified time information of the arrangement points H1 to H4 of the path P1 and time information and specified time information of the images G30 to G40, from the path storage unit 5 and the image storage unit 7, respectively. In the steps corresponding to the steps S12 and S22 of the exemplary embodiments 1 and 2, by comparing time information and specified time information of both sides described above, the images to be arranged at the arrangement points H1 to H4 are selected.

The processing unit 8 selects 'BIRTH' of the image G30 having time information of '0' and specified time information of 'SEPTEMBER', as an image to be arranged at the arrangement point H1, from the fact that the arrangement point H1 has time information of '0' and specified time information of 'INDEFIMTE'. In addition, from the fact that the arrangement point H2 has time information of '0.3' and specified time information of 'APRIL', the processing unit 8 first selects the images G32 and G33 having time information '0.33' close to time information '0.3', and then, selects 'ENTER ELEMENTARY SCHOOL' of the image G33 having specified time information of 'APRIL', as an image to be arranged at the arrangement point H2. In addition, from the fact that the arrangement point H3 has time information of '0.7' and specified time information of 'APRIL', the processing unit 8 first selects the images G36 and G37 having time information '0.75', and then, selects 'ENTER HIGH SCHOOL' of the image G37 having specified time information of 'APRIL', as an image to be arranged at the arrangement point H3. In addition, from the fact that the arrangement point H4 has time information of '1' and specified time information of 'JANUARY', the processing unit 8 selects 'ADULT' of the image G40 having time information of '1' and specified time information of 'JANUARY', as an image to be arranged at the arrangement point H4. In other words, the processing unit 8 selects 'BIRTH' for the image G30, 'ENTER ELEMENTARY SCHOOL' for the image G33, 'ENTER HIGH SCHOOL' for the image G37, and 'ADULT' for the image G40, as images to be arranged at the arrangement points H1 to H4 of the path P1.

As described above, in the device of the modified example of the third exemplary embodiment, by comparing time information to specified time information of the arrangement points H1 to H4 of the path P1 and comparing the time information to specified time information of the images G30 to G40, the processing unit 8 selects images having time information and specified time information same as or similar to time information and specified time information of the arrangement points H1 to H4, as images to be arranged at the arrangement points H1 to H4. Accordingly, eye flow chasing the images arranged on the path P1 can be natural compared with the prior art. Furthermore, by using images related to year corresponding to time information as well as month and season corresponding to specified time information, for example, the image concerning adult ceremony can be naturally arranged.

While this invention has been described in conjunction with the specific embodiments thereof, it is evident that many alternatives, modifications, and variations will be apparent to those skilled in the art. Accordingly, preferred embodiments of the invention as set forth herein are intended to be illustrative, not limiting. There are changes that may be made without departing from the spirit and scope of the invention.

What is claimed is:

1. A layout element arranging device, comprising:
   a first storage unit that prestores L paths (where L is a positive integer greater than 1) each having M arrangement points (where M is a positive integer specific to each path), the M arrangement points of a path including a start point and an end point of the path, each of the M arrangement points having a first time difference indicating a distance from the start point to the arrangement point, the first time difference between the start point and the end point being normalized to have a length of 1:

a second storage unit that prestores N layout elements (where N is any positive integer), the N layout elements having respective different directional information, the N layout elements including a beginning element and a final element, each of the N layout elements having a second time difference indicating a distance from the beginning element to the layout element, the second time difference between the beginning element and the final element being normalized to have a length of 1:

a display that displays the L paths, a first selection unit that selects one oath from the L paths, the first select unit prompting a user to select a single path from the displayed paths for arranging the layout elements along the selected single path; and a second selection unit that selects one layout element from the N layout elements to arrange the one layout element to one arrangement point among the M arrangement points of the selected one path, each of the M arrangement points having first information indicating a direction specified by a shape of the path of the arrangement point;

each of the N layout elements having second information indicating a direction specified by a content of the layout element, the second information including facial direction information; and the second selection unit selecting the one layout element based on
1) comparison between the direction in the first information of an arrangement point with the facial direction information in the second information of each layout elements, and
2) comparison between the first time difference and the second time difference, to select a layout element having
1) the facial direction information that is closest to the direction in the first information, and
2) the second time difference that is closest to the first time difference, a state in which the selected one layout element is arranged being the same as a state in which the one layout element is prestored.

2. The layout element arranging device according to claim 1, each of the M arrangement points having first information indicating a time concerning a position of the arrangement point of the one path;

each of the N layout elements having second information indicating a time concerning the one layout element of the N layout elements; and the second selection unit selecting the one layout element based on the first information of the one arrangement point and the second information of the N layout elements.

3. The layout element arranging device according to claim 2, the second selection unit selecting a layout element having the time indicated by the second information closest to the time indicated by the first information of the one arrangement point, as the one layout element.

4. The layout element arranging device according to claim 2, the time concerning the position of the arrangement point being relatively specified by the position of the arrangement point of the one path.

5. The layout element arranging device according to claim 2, the time concerning the position of the arrangement point being absolutely specified by the position of the arrangement point of the one path.

6. The layout element arranging device according to claim 1, each of the M arrangement points having first information indicating a time concerning a position of the arrangement point of the one path and second information indicating a direction specified by a shape of the path of the arrangement point;

each of the N layout elements having third information indicating a time concerning the one layout element of the N layout elements and fourth information indicating a direction specified by a content of the layout element; and the second selection unit selecting a layout element based on the first and second information of the one arrangement point and the third and fourth information of the N layout elements, as the one layout element.

7. The layout element arranging device according to claim 6, the second selection unit selecting, as the one layout element, a layout element having a time indicated by the third information and a direction indicated by the fourth information which are closest to the time indicated by the first information of the one arrangement point and the direction indicated by the second information, respectively.

8. A layout element arranging method, comprising:

a first selection step of selecting one path from prestored L paths (where L is a positive integer greater than 1) each having M arrangement points (where M is a positive integer specific to each path), the M arrangement points of a oath including a start point and an end point of the path, each of the M arrangement points having a first time difference indicating a distance from the start point to the arrangement point, the first time difference between the start point and the end point being normalized to have a length of 1:

prestoring in a storage unit N layout elements (where N is any positive integer), the N layout elements having respective different directional information, the N layout elements including a beginning element and a final element, each of the N layout elements having a second time difference indicating a distance from the beginning element to the layout element, the second time difference between the beginning element and the final element being normalized to have a length of 1:

a displaying step of displaying the L paths on a display unit, and prompting a user to select a single path from the displayed paths for arranging the layout elements along the selected single path; and a second selection step of selecting one layout element from the N layout elements to arrange the one layout element to one arrangement point among the M arrangement points of the selected one path, each of the M arrangement points having first information indicating a direction specified by a shape of the path of the arrangement point;

each of the N layout elements having second information indicating a direction specified by a content of the layout element, the second information including facial direction information; and in the second selection step, a layout element being selected based on
1) comparison between the direction in the first information of an arrangement point with the facial direction information in the second information of each layout elements, and
2) comparison between the first time difference and the second time difference to select a layout element having
1) the facial direction information that is closest to the direction in the first information, and
2) the second time difference that is closest to the first time difference. a state in which the selected one layout element is arranged being the same as a state in which the one layout element is prestored.

9. The arranging a layout element arranging method according to claim 8,
each of the M arrangement points having first information indicating a time concerning a position of the arrangement point of the one path;
each of the N layout elements having second information indicating a time concerning the one layout element of the N layout elements; and
in the second selection step, the one layout element being selected based on the first information of the one arrangement point and the second information of the N layout elements.

10. The layout element arranging method according to claim 9,
in the second selection step, a layout element having the time indicated by the second information closest to the time indicated by the first information of the one arrangement point being selected as the one layout element.

11. The layout element arranging method according to claim 9,
the time concerning the position of the arrangement point being relatively specified by the position of the arrangement point of the one path.

12. The layout element arranging method according to claim 9,
the time concerning the position of the arrangement point being absolutely specified by the position of the arrangement point of the one path.

13. The layout element arranging method according to claim 8,
each of the M arrangement points having first information indicating a time concerning a position of the arrangement point of the one path and second information indicating a direction specified by a shape of the path of the arrangement point;
each of the N layout elements having third information indicating a time concerning the one layout element of the N layout elements and fourth information indicating a direction specified by a content of the layout element; and
in the second selection step, a layout element being selected based on the first and second information of the one arrangement point and the third and fourth information of the N layout elements, as the one layout element.

14. The layout element arranging method according to claim 13,
in the second selection step, a layout element having a time indicated by the third information and a direction indicated by the fourth information, which are closest to the time indicated by the first information of the one arrangement point and the direction indicated by the second information, respectively, being selected as the one layout element.

15. A computer-readable storage medium having a layout element arranging program embedded thereon, the layout element arranging program, when excited, causing a computer including a first selection unit and a second selection unit to perform arrangement of layout elements to arrangement points of paths, the layout element arranging program comprising:
a first selection step of making the first selection unit select one path from prestored L paths (where L is a positive integer greater than 1) each having M arrangement points (where M is a positive integer specific to each path), the M arrangement points of a path including a start point and an end point of the path, each of the M arrangement points having a first time difference indicating a distance from the start point to the arrangement point, the first time difference between the start point and the end point being normalized to have a length of 1:
prestoring in a storage unit N layout elements (where N is any positive integer), the N layout elements having respective different directional information, the N layout elements including a beginning element and a final element, each of the N layout elements having a second time difference indicating a distance from the beginning element to the layout element, the second time difference between the beginning element and the final element being normalized to have a length of 1:
a displaying step of displaying the L paths on a display unit, and prompting a user to select a single path from the displayed paths for arranging the layout elements along the selected single path; and
a second selection step of making the second selection unit select one layout element from the N layout elements to arrange the one layout element to one arrangement point among the M arrangement points of the selected one path,
each of the M arrangement points having first information indicating a direction specified by a shape of the path of the arrangement point;
each of the N layout elements having second information indicating a direction specified by a content of the layout element, the second information including facial direction information; and
in the second selection step, a layout element being selected based on
1) comparison between the direction in the first information of an arrangement point with the facial direction information in the second information of each layout elements, and
2) comparison between the first time difference and the second time difference, to select a layout element having
1) the facial direction information that is closest to the direction in the first information, and
2) the second time difference that is closest to the first time difference, a state in which the selected one layout element is arranged being the same as a state in which the one layout element is prestored.

16. The layout element arranging program according to claim 15,
- each of the M arrangement points having first information indicating a time concerning a position of the arrangement point of the one path;
- each of the N layout elements having second information indicating a time concerning the one layout element of the N layout elements; and
- in the second selection step, the one layout element being selected based on the first information of the one arrangement point and the second information of the N layout elements.

17. The layout element arranging program according to claim 15,
- each of the M arrangement points having first information indicating a time concerning a position of the arrangement point of the one path and second information indicating a direction specified by a shape of the path of the arrangement point;
- each of the N layout elements having third information indicating a time concerning the one layout element of the N layout elements and fourth information indicating a direction specified by a content of the layout element; and
- in the second selection step, a layout element being selected based on the first and second information of the one arrangement point and the third and fourth information of the N layout elements, as the one layout element.

18. An electronic apparatus, having a layout element arranging device, the layout element arranging device comprising:
- a first storage unit that prestores L paths (where L is a positive integer greater than 1) each having M arrangement points (where M is a positive integer specific to each path), the M arrangement points of a path including a start point and an end point of the path, each of the M arrangement points having a first time difference indicating a distance from the start point to the arrangement point, the first time difference between the start point and the end point being normalized to have a length of 1:
- a second storage unit that prestores N layout elements (where N is any positive integer), the N layout elements having respective different directional information, the N layout elements including a beginning element and a final element, each of the N layout elements having a second time difference indicating a distance from the beginning element to the layout element, the second time difference between the beginning element and the final element being normalized to have a length of 1:
- a display that displays the L paths,
- the first selection unit that selects one path from the L paths, the first select unit prompting a user to select a single path from the displayed paths for arranging the layout elements along the selected single path; and
- a second selection unit that selects one layout element from the N layout elements to arrange the one layout element to one arrangement point among the M arrangement points of the selected one path,
- each of the M arrangement points having first information indicating a direction specified by a shape of the path of the arrangement point;
- each of the N layout elements having second information indicating a direction specified by a content of the layout element, the second information including facial direction information; and
- the second selection unit selecting the one layout element based on
  1) comparison between the direction in the first information of an arrangement point with the facial direction information in the second information of each layout elements, and
  2) comparison between the first time difference and the second time difference to select a layout element having
  1) the facial direction information that is closest to the direction in the first information, and
  2) the second time difference that is closest to the first time difference. a state in which the selected one layout element is arranged being the same as a state in which the one layout element is prestored.

19. The electronic apparatus according to claim 18, further comprising:
- a path input unit that inputs the L paths.

20. The electronic apparatus according to claim 18, further comprising:
- a layout element input unit that stores the N layout elements

21. The electronic apparatus according to claim 18, further comprising:
- a path storage unit that stores the L paths.

22. The electronic apparatus according to claim 18, further comprising:
- an image display unit that displays arrangement of one layout element of the N layout elements to each of the M arrangement points of the one path.

* * * * *